United States Patent [19]
Yabuuchi et al.

[11] Patent Number: 5,603,986
[45] Date of Patent: Feb. 18, 1997

[54] METHOD OF PREPARING MICROCAPSULES

[75] Inventors: Naoya Yabuuchi, Toyonaka; Tsuyoshi Imamura, Katano; Takahiro Mukae, Yawata; Keizou Ishii, Ashiya, all of Japan

[73] Assignee: Nippon Paint Co., Ltd., Osaka, Japan

[21] Appl. No.: 398,802

[22] Filed: Mar. 6, 1995

[30] Foreign Application Priority Data

Mar. 9, 1994 [JP] Japan .................................. 6-038142

[51] Int. Cl.⁶ ............................................. B01J 13/16
[52] U.S. Cl. ................... 427/213.34; 264/4.7; 430/137; 430/138
[58] Field of Search ................ 264/4.7; 427/213.34; 430/138, 137

[56]  References Cited

U.S. PATENT DOCUMENTS

| | | | |
|---|---|---|---|
| 4,087,581 | 5/1978 | Vincent et al. | 428/327 |
| 4,385,164 | 5/1983 | Sinclair et al. | 526/201 |
| 5,049,322 | 9/1991 | Devissaguet et al. | 264/4.1 |
| 5,277,979 | 1/1994 | Kielbania et al. | 428/402.21 |
| 5,433,953 | 7/1995 | Tsuei et al. | 424/489 |

FOREIGN PATENT DOCUMENTS

| | | |
|---|---|---|
| A0038979 | 4/1981 | European Pat. Off. . |
| A0214936 | 9/1986 | European Pat. Off. . |
| A0611253 | 2/1994 | European Pat. Off. . |
| 62-156991 | 7/1987 | Japan . |
| 3221137 | 9/1990 | Japan . |
| A03097711 | 7/1991 | Japan . |
| WO8300449 | 2/1983 | WIPO . |

*Primary Examiner*—Mark Nagumo
*Attorney, Agent, or Firm*—Townsend & Banta

[57]  ABSTRACT

A method of preparing microcapsules includes the steps of preparing a block polymer having a block of a hydrophobic repeating unit and a block of a hydrophilic repeating unit, and employing the block polymer as a protective colloid for preparing microcapsules in a nonaqueous medium by interfacial polymerization.

10 Claims, No Drawings

METHOD OF PREPARING MICROCAPSULES

BACKGROUND OF THE INVENTION

1. Field of the Invention

The present invention relates to methods of preparing microcapsules and resin particles, as well as microcapsules and resin particles, and more particularly, it relates to methods of preparing microcapsules and resin particles in nonaqueous media, and microcapsules and resin particles having fine particle sizes.

2. Description of the Background Art

Microcapsules which are capable of internally containing various materials are utilized in various fields. In general, such microcapsules are prepared by two types of methods, i.e., physical/mechanical methods and chemical methods. Depending on the usage, microcapsules of fine particle sizes may be required. However, it is difficult to prepare such microcapsules of fine particle sizes by physical/mechanical methods, and hence the same are prepared by chemical methods. Coacervation, interfacial polymerization and in situ method are known as such chemical methods.

In specific fields which are related to recording materials, medical materials and coating materials, ultrafine microcapsules of the so-called submicron order having particle sizes of not more than 1 μm may be required. However, such microcapsules of not more than 1 μm in particle size are not industrially prepared in general, and methods for preparing the same are not known in the art either. Japanese Patent Laying-Open No. 63-232840 (1988) discloses a method of preparing microcapsules having particle sizes of not more than 0.5 μm by dispersing a polymer compound in the presence of a surface-active agent. However, this method is adapted to prepare a wall of microcapsules by adding a liquid phase to a solution in which a polymer compound is dissolved to separate the polymer, through dissolution and separation of the polymer. Therefore, the microcapsules as obtained are disadvantageously inferior in solvent resistance, for example.

On the other hand, Japanese Patent Laying-Open No. 3-221137 (1991) discloses a method of dispersing a hydrophobic material for serving as a core material in an organic phase in which self-dispersible resin having diisocyanate group is dissolved and adding an aqueous solution in which diamine etc. is dissolved thereto, for instantaneously obtaining fine particles in the water medium and forming microcapsule walls. According to this method, however, the fine particles are obtained in the water and hence the material to be contained in the microcapsules is limited to that which is slightly soluble or insoluble in the water. According to this method, further, the fine particles and the microcapsule walls are instantaneously formed and hence the capsulating states, particle sizes and particle size distribution of the microcapsules as obtained are remarkably influenced by the conditions for mixing the organic phase and the aqueous solution. In addition, this gazette describes that it is extremely difficult to obtain ultrafine capsules of the submicron order.

As hereinabove described, there is no method of preparing microcapsules having fine particle sizes of not more than 1 μm in a nonaqueous medium in general, and hence it is generally impossible to prepare microcapsules having particle sizes of the submicron order with cores of a water soluble material.

SUMMARY OF THE INVENTION

An object of the present invention is to provide a method which can prepare microcapsules of not more than 1 μm in average particle size in a nonaqueous medium by interfacial polymerization.

Another object of the present invention is to provide microcapsules of not more than 1 μm in average particle size, having excellent solvent resistance with cores consisting of a water soluble material, which can be prepared by the aforementioned method.

The inventive method of preparing microcapsules comprises the steps of preparing a block polymer having a block of a hydrophobic repeating unit and a block of a hydrophilic repeating unit, and employing this block polymer as a protective colloid for preparing microcapsules in a nonaqueous medium by interfacial polymerization.

The inventive method of preparing microcapsules can be applied to preparation of bulky resin particles when no core materials are present to be contained in microcapsules.

The inventive method of preparing resin particles comprises the steps of preparing a block polymer having a block of a hydrophobic repeating unit and a block of a hydrophilic repeating unit, and employing this block polymer as a protective colloid for preparing resin particles in a nonaqueous medium by interfacial polymerization.

On the other hand, the inventive microcapsules, which can be prepared by the aforementioned method, are those of not more than 1 μm in average particle size obtained by employing a block polymer having a block of a hydrophobic repeating unit and a block of a hydrophilic repeating unit as a protective colloid and polymerizing a compound having at least two active hydrogens and a compound having at least two functional groups which are reactive with the active hydrogens in the presence of core material in a nonaqueous medium.

Further, the inventive resin particles, which can be prepared by the aforementioned method, are those of not more than 1 μm in average particle size obtained by employing a block polymer having a block of a hydrophobic repeating unit and a block of a hydrophilic repeating unit as a protective colloid and polymerizing a compound having at least two active hydrogens and a compound having at least two functional groups which are reactive with the active hydrogens in the presence of core material in a nonaqueous medium.

The present invention is now described in further detail.

Protective Colloid

In the method according to the present invention, a block polymer having a block of a hydrophobic repeating unit (hereinafter simply referred to as a "hydrophobic block") and a block of a hydrophilic repeating unit (hereinafter simply referred to as a "hydrophilic block") is employed as a protective colloid. It is possible to obtain microcapsules of not more than 1 μm in average particle size by employing this block polymer. In the block polymer employed in the present invention, these blocks having the specific repeating units are linearly bonded with each other.

The block polymer can be prepared from that having polysiloxane and polyalkylene oxide as the hydrophobic and hydrophilic blocks respectively, for example.

Examples of the polysiloxane are polydimethylsiloxane, polymethylphenylsiloxane, polydiphenylsiloxane and polymethylpropylsiloxane. The number average molecular weight of the polysiloxane block is preferably 1000 to 50000, and more preferably 2000 to 10000.

On the other hand, examples of the polyalkylene oxide forming the hydrophilic block are polymethylene oxide, polyethylene oxide, polypropylene oxide and polytetramethylene oxide. Among these, the polyethylene oxide is particularly preferable. The number average molecular weight of the polyalkylene oxide block is preferably 100 to 200000, and more preferably 1000 to 100000. If the number average molecular weights of the hydrophobic and hydrophilic blocks are out of the aforementioned ranges, dispersibility may be inferior while workability may be deteriorated due to high viscosity.

The protective colloid employed in the present invention can also be prepared from a block polymer which is obtained by polymerization such as anionic polymerization of an acrylic monomer. Such a block polymer can be obtained by block-copolymerizing a polymer of a hydrophobic acrylic monomer with a hydrophilic acrylic monomer. Examples of the hydrophobic acrylic monomer are lauryl methacrylate and stearyl methacrylate, and examples of the hydrophilic acrylic monomer are hydroxy-2-ethyl methacrylate, methacrylic acid, acrylic acid, methacrylamide and acrylamide. In the block polymer of these materials, a polymer block of the hydrophobic acrylic monomer serves as the hydrophobic block, and that of the hydrophilic acrylic monomer serves as the hydrophilic block. The number average molecular weight of the hydrophobic block is preferably 1000 to 50000, and more preferably 2000 to 10000. On the other hand, the number average molecular weight of the hydrophilic block is preferably 100 to 200000, and more preferably 1000 to 100000. If the number average molecular weights of the hydrophobic and hydrophilic blocks are out of the aforementioned ranges, dispersibility may be inferior while workability may be deteriorated due to high viscosity.

Graft Polymer

According to the present invention, it is possible to utilize a graft polymer as an auxiliary protective colloid, in order to enhance functions such as that for preventing aggregation of particles in polymerization reaction and keeping stability to contamination with other solvent. The graft polymer according to the present invention has a backbone of a hydrophobic block and a branch of a hydrophilic block. For example, such a graft polymer has a main chain of an acrylic polymer as a backbone part, and a polyoxyalkylene chain as a branch part. It is known in the art that such a polymer is obtained by synthesizing an acrylic polymer and thereafter further polymerizing the same with another monomer for serving as a branch part, while it is also possible to obtain the polymer by acrylic polymerization employing a macromonomer having a polyethylene oxide chain. In this graft polymer, the number average molecular weight of the backbone part is preferably 1000 to 100000, and more preferably 5000 to 50000, while that of the branch part is preferably 200 to 50000, and more preferably 300 to 10000. When the number average molecular weights of the backbone and branch parts of the graft polymer are out of these ranges, it may be impossible to sufficiently attain the function of the graft polymer for preventing aggregation of particles.

Microcapsule Wall

According to the present invention, microcapsule walls are formed by interfacial polymerization employing the aforementioned protective colloid in a nonaqueous medium. Exemplary methods of the interfacial polymerization are interfacial polycondensation and interfacial polyaddition. Such interfacial polymerization can be performed by reacting a compound having at least two active hydrogens with a compound having at least two functional groups which are reactive with the active hydrogens. These compounds are now described.

Compound Having at least Two Active Hydrogens (hereinafter referred to as a "monomer A")

The active hydrogens are preferably prepared from those of primary amino groups or hydroxyl groups, in consideration of reactivity. Examples of the compound having at least two such active hydrogens are a polyamine compound and a polyol compound. Examples of the polyamine compound are hexamethylenediamine, m-xylylenediamine, iminobispropylamine, $\alpha,\omega$-bis-(3-aminopropyl)-propylene glycol ether, and 2-methylpentadiamine. Examples of the polyol compound are ethylene glycol, 2-methyl-1,3-propanediol, 1,4-butanediol, 1,9-nonanediol, glycerol, and pentaerythritol.

Compound Having at least Two Functional Groups Reactive with Active Hydrogens (hereinafter referred to as a "monomer B")

The functional groups which are reactive with the aforementioned active hydrogens are preferably prepared from isocyanate groups or acid halide groups, in consideration of reactivity. Examples of the compound having at least two functional groups which are reactive with the aforementioned active hydrogens are a polyisocyanate compound and a compound having at least two acid halide groups. Examples of the polyisocyanate compound are hexamethylene diisocyanate, toluene diisocyanate, isophorone diisocyanate, xylene diisocyanate, tetramethylxylene diisocyanate, trimers of such diisocyanates, and adducts of the diisocyanates and polyhydric alcohols. Examples of the compound having at least two acid halide groups are terephthalic acid chloride, isophthalic acid chloride and sebacoyl chloride.

Core Materials

According to the inventive method, the microcapsule walls are formed in the nonaqueous medium and hence it is possible to capsulate core materials of a polar material such as a water soluble material in the microcapsules. According to the present invention, however, the core materials are not limited to those of such a polar material, but can be prepared from any material so far as the same is dispersed in the nonaqueous medium.

Examples of the core materials are compounds having coloring functions such as benzidine yellow, benzidine orange, fast red, brilliant carmine 3B, copper phthalocyanine blue, copper phthalocyanine green, victoria blue, spirit black, oil blue, alkali blue, fast scarlet, rhodamine 6B, fast sky blue, nigrosine and carbon black. It is also possible to employ surface treated pigments such as carbon black which is dyed with nigrosine, and graft carbon which is graft-polymerized with a polymer, for example. In addition, it is also possible to employ bisarylazo derivatives of 2,3-naphthalenediol, formazane dyeing pigments, lake pigments, photochromic dyes such as spiropyran and spirooxazine, and thermosensitive coloring dyes.

On the other hand, examples of a compound having a catalytic function are organic acids such as p-toluenesulfonic acid, dodecylbenzenesulfonic acid and naphthalenesulfonic acid, inorganic acids such as hydrochloric acids and phosphoric acids, organic bases such as quaternary ammonium salts, hydroxides of an alkaline metal and an alkaline earth metal, and inorganic bases such as carbonates.

Examples of a cationic part of quaternary ammonium salt are tetrabutylammonium, tetramethylammonium, tetraethylammonium, trimethylbenzylammonium, tetrapropylammonium, terahexylammonium, tetraoctylammonium, tetradecylammonium, tetrahexadecylammonium, triethylhexylammonium, 2-hydroxyethyltrimethylammonium, methyltrioctylammonium, cetyltrimethylammonium, 2-chloroethyltrimethylammonium and methylpyridinium, while examples of an anionic part are fluoride, bromide, chloride, iodide, acetate, laurate, glycolate, benzoate, salicylate, methanesulfonate, p-toluenesulfonate, dodecylbenzensulfonate, triflate, nitrate, sulfate and methosulfate.

According to the present invention, the core materials are not restricted to the aforementioned coloring agents and catalysts, but may be selected from other various functional materials such as UV absorbents, for example.

Method of Preparing Microcapsules

The inventive method of preparing microcapsules is not particularly limited so far as the same is adapted to form microcapsule walls in a nonaqueous medium by interfacial polymerization employing the aforementioned protective colloid. In order to form the microcapsule walls by polymerization reaction of the monomers A and B, a method of dispersing one of the monomers in the nonaqueous medium in the form of fine particle through the protective colloid and adding the other monomer thereto is generally employed. In this case, the monomer which is added later is preferably dissolvable in the nonaqueous medium. In general, the monomer A and the core materials are dispersed in the nonaqueous medium and the monomer B is dripped in this dispersion to cause polymerization reaction, thereby forming microcapsule walls.

In order to prepare the dispersion of the monomer A and the core materials, it is possible to employ a method of introducing the core materials, the monomer A, the protective colloid and the nonaqueous medium into a vessel and dispersing the monomer A and the core materials by stirring the same at a high speed, or a phase inversion method of stirring the core materials, the monomer A and the protective colloid and dripping the nonaqueous medium for bringing the same into a dispersed state. In consideration of versatility of the stirrer, the phase inversion method is preferable.

According to the inventive method, the core materials may be in the form of either solids or liquids, while the same can form a solution with a solvent such as methanol, water, ethylene glycol or diethylene glycol as needed.

Examples of the nonaqueous medium employed in the present invention are solvents such as straight-chain or branched aliphatic, alicyclic and aromatic hydrocarbons and halogen substitution products thereof, and two or more such solvents may be mixed with each other. Specifically, solvents selected from octane, isooctane, decane, isodecane, decalin, nonane, dodecane, isododecane, cyclohexane, cyclooctane, cyclodecane, toluene, xylene, mesitylene, Isopar E, Isopar G, Isopar H, Isopar L (Isopar: trade name for products by Exxon Corporation), Shellsol 70, Shellsol 71 (Shellsol: trade name for products by Shell Oil Corporation), and Amusco OMS and Amusco 460 (Amusco: trade name for products by Spirits Corporation) independently or in mixed states. It is preferable in the present invention that the monomer A is dispersed and the monomer B is dissolved in the nonaqueous medium.

The monomer B is dripped in the dispersion liquid which is obtained through the aforementioned procedure, so that polymerization reaction progresses to obtain microcapsules in a dispersed state. This polymerization reaction can be performed at 0° to 90° C. in general. When the monomer B is prepared from a compound having at least two acid halide groups for making polycondensation reaction, it is preferable to employ a de-halogenated hydrogen material such as tertiary amines. When the monomer B is prepared from a polyisocyanate compound, on the other hand, it is possible to employ an organic tin compound such as dibutyltin laurate as a catalyst. Such a de-halogenated hydrogen material or catalyst is preferably previously contained in a dispersion liquid in which the monomer A is dispersed.

In general, the microcapsules are formed with progress of the polymerization reaction. It is possible to finish the polymerization reaction by confirming no change in amount of the isocyanate groups contained in the nonaqueous medium by a general analytical method such as infrared spectrum analysis.

According to the present invention, a mixing ratio of the monomers A and B are as follows: The equivalent ratio of the monomer B to the monomer A is preferably 0.4 to 2, and more preferably 0.6 to 1.2. If the equivalent ratio is out of this range, it may be impossible to obtain the target microcapsules. Further, the amount of the core materials is preferably 0.01 to 3 part by weight, more preferably 0.05 to 0.5 part by weight with respect to the sum of 1 part by weight of the monomers A and B. Functional appearance is inferior if the amount of the core materials is too large, while a problem may be caused in stability of the microcapsules as obtained if the amount of the core materials is too large.

On the other hand, the amount of the block polymer is preferably 0.01 to 1.0 parts by weight, more preferably 0.03 to 0.2 part by weight with respect to the sum of 1 part by weight of the monomers A and B. Stability in the polymerization reaction may be reduced if the amount of the block polymer is too small, while economic disadvantage may be caused if the amount of the block polymer is too large.

The nonaqueous medium is preferably employed in an amount of 2.5 to 20 parts by weight with respect to the sum of 1 part by weight of the monomers A and B. While the nonaqueous medium can be employed not only for dispersing the monomer A, the block polymer and the core materials but for diluting the monomer B, the total amount thereof is preferably within the aforementioned range.

A microcapsule dispersion obtained through the aforementioned procedure may contain an aggregate. In this case, it is possible to remove the aggregate by filtering the same. It is also possible to take out the microcapsules themselves by a method such as spray drying or centrifugation.

Confirmation of Capsulating State

When the microcapsules encapsulate core materials of a compound having a coloring function, it is possible to visually confirm encapsulating such core materials through coloring of the microcapsules and non-coloring of the solvent in which the microcapsules are dispersed. If the capsulation cannot be confirmed through such coloration, it is possible to confirm the same through observation with a transmission electron microscope and elusion of the core materials in an aqueous phase when introducing the microcapsules into the water. This elution can be made by a general analytical method such as HPLC or NMR.

In the method according to the present invention, resin particles are prepared when no core materials are present. In order to prepare resin particles by polymerization reaction of the monomers A and B, therefore, it is possible to disperse the monomer A in a nonaqueous medium employing the protective colloid and drip the monomer B in this dispersion for making polymerization reaction.

The inventive microcapsules, which can be prepared by the aforementioned method, have an average particle size of not more than 1 μm, more generally in the range of 0.05 to 1 μm. The average particle size of such microcapsules can be measured through a particle size measuring device utilizing light scattering or laser diffraction.

The inventive resin particles can be obtained by the aforementioned method without introduction of core materials, and the average particle size thereof is not more than 1 μm, more generally within the range of 0.05 to 1 μm. The average particle size of such resin particles can also be measured through a particle size measuring device, similarly to the aforementioned microcapsules.

According to the inventive method, it is possible to prepare microcapsules having an average particle size of not more than 1 μm in a nonaqueous medium. Thus, it is possible to prepare microcapsules of the submicron order capsulating core materials of a polar material such as a water soluble material.

Since the average particle size of the inventive microcapsules is not more than 1 μm, it is possible to attain an effect of improving image resolution, for example, when the microcapsules contain toner or the like for application to a recording material. When the microcapsules capsulate core materials of a coloring agent and blended in a coating material or the like, further, excellent appearance of a coating film can be obtained since the microcapsules are in the state of submicron-order particulates.

The foregoing and other objects, features, aspects and advantages of the present invention will become more apparent from the following detailed description of the present invention.

DESCRIPTION OF THE PREFERRED EMBODIMENTS

Synthetic Example 1 Synthesis of Polysiloxane-Polyalkylene Oxide Block Polymer 476.5 g of FM-0421 (polydimethylsiloxane with a molecular weight of 5000 having a hydroxyl group on one end: product by Chisso Corporation), 23.5 g of isophorone diisocyanate and 0.06 g of dibutyltin laurate were mixed with each other and the mixture as obtained was maintained at 75° C. to make reaction. The equivalent of isocyanate was measured after a lapse of 8 hours from starting of the reaction, to confirm disappearance of the isocyanate group in a theoretical value. After the mixture was cooled to the room temperature, 191.5 g of Jeffermine M2070 (polyethylene glycol with a molecular weight of 2000 having an amino group on one end: product by Mitsui Texaco Corporation) was added to the mixture, which in turn was stirred for 2 hours so that reaction was thereafter continued at 40° C. for 2 hours. The infrared absorption spectrum was measured, to confirm absence of isocyanate group. Then, the reaction was finished to obtain a polysiloxane-polyalkylene oxide block polymer. Through measurement with GPC, this block polymer exhibited a number average molecular weight of 7160 and a weight average molecular weight of 9240.

Synthetic Example 2 Synthesis of Acrylic Block Polymer

Under a high vacuum, a tetarahydrofuran solution of sodium salt of a-methylstyrene tetramer was introduced into a polymerization vessel, and removed after sufficiently washing the vessel. Then, 198 ml of tetrahydrofuran and 18 ml (3.0 mmole) of a benzene solution of 1,1-diphenylhexyl lithium were introduced under the room temperature into the vessel, which in turn was cooled to −78° C. Then, 111 ml (74 mmole) of a tetrahydrofuran solution of n-lauryl methacrylate was introduced into the vessel to start polymerization. After a lapse of 2 hours, the mixture was further stirred for 30 minutes with introduction of 95 ml (66 mmole) of a tetrahydrofuran solution of 3-methacryloylethoxydimethyl-isopropylsilane, thereafter the reaction was stopped with addition of 2 ml of methanol, and 1 ml of 2N-hydrochloric acid was added into the reaction vessel to obtain a block polymer of poly n-lauryl methacrylate and polyhydroxyethyl methacrylate. After the reaction was finished, the solvent was removed so that the nonvolatile content was 50%. Hydrophobic and hydrophilic blocks forming this block polymer exhibited molecular weights of 2410 and 1210 respectively.

Synthetic Example 3 Synthesis of Graft Polymer 750 g of methyl ethyl ketone was introduced into a vessel provided with a stirrer, a reflux condenser and a nitrogen introducting tube, and the temperature was increased to 75° C. A mixture of 321 g of cetyl methacrylate, 50 g of methyl methacrylate, 129 g of an ethylene oxide 15 mole adduct of hydroxyethyl methacrylate, 400 g of methyl ethyl ketone and V-601 (azo initiator by Wako Pure Chemical Industries, Ltd.) was dripped in the vessel over 30 minutes, further stirred for 1 hour and thereafter the reaction was finished. The solvent was removed from the graft polymer as obtained, and the nonvolatile content was adjusted to 50%. This polymer had a molecular weight of 13600.

Example 1 Preparation of Microcapsules Containing UV Absorbent 40 g of polyethylene glycol having a molecular weight of 200, 10 g of glycerol, 50 g of Tinuvin-123 (UV absorbent by Chiba-Geigy Co. Ltd.) and 10 g of the block polymer obtained in Synthetic Example 1 were blended with each other by a stirrer at 8000 rpm. 400 g of Isopar M (hydrocarbon solvent by Exxon Corporation) was gradually dripped in the mixture which was continuously stirred, to obtain a dispersion by a phase inversion method. This dispersion was transferred to another reaction vessel so that 0.08 g of dibutyltin laurate was added thereto, and a 20% Isopar G solution of toluene diisocyanate of 0.95 equivalent with respect to the hydroxyl groups was dripped therein at the room temperature over 1 hour. After a lapse of 2 hours from finishing of the dripping, the temperature was increased up to 45° C. for making further reaction for 2 hours. Through measurement with a particle size measuring device SALAD 2000 by Shimadzu Corporation, the average particle size of polyurethane particles as obtained was 0.66 μm. Further, the amount of microcapsules which were obtained by filtering through a screen of 200 meshes was 97% with respect to the total weight of the polyol and the diisocyanate as employed. In a liquid phase of the microcapsule dispersion liquid obtained after centrifugation, no separation of Tinuvin-123 was confirmed but it was possible to confirm that the UV absorbent was encapsulated in the microcapsules.

Example 2 Preparation of Microcapsules Containing Pigment 85 g of polyethylene glycol having a molecular weight of 200 and 15 g of phthalocyanine blue were dispersed through a sand grinder, and 5 g of the block polymer obtained in Synthetic Example 1 as well as 5 g of the graft polymer obtained in Synthetic Example 3 were added thereto so that these elements were blended with each other by a stirrer at 8000 rpm. 400 g of Isopar G was gradually dripped in the continuously stirred mixture, to obtain a dispersion liquid by a phase inversion method. This dispersion liquid was transferred into another reaction vessel, 0.08 g of dibutyltin laurate was added into this vessel, and a 20% Isopar G solution of toluene diisocyanate of 0.8 equivalent with respect to the hydroxyl groups was dripped in the mixture at the room temperature over 1 hour. After a lapse of 2 hours from finishing of the dripping, the temperature was increased up to 45° C., to make further reaction for two hours. The average particle size of polyurethane particles as obtained was 0.74 μm through measurement similar to that in Example 1. The amount of microcapsules which were obtained by filtering through a screen of 200 meshes was 96% with respect to the total weight of the diol and the diisocyanate as employed. The states of the microcapsules were observed with a transmission electron microscope, to confirm capsulation of the pigment in the microcapsules without observation of pigment crystals.

Examples 3 to 6 Preparation of Microcapsules Containing Pigment

Ratios of the pigment, the monomers A and B and the nonaqueous medium as well as the block polymer and the graft polymer were properly varied to carry out operations similar to that in Example 2, thereby obtaining microcapsules containing pigments. Table 1 shows the blending ratios and the average particle sizes of the microcapsules as obtained.

Comparative Example 1 Exemplary Preparation with Employment of General Compound as Protective Colloid 10 g of sorbitan tristearate was employed as a conventional protective colloid in place of the block polymer and the graft polymer in Example 5 to prepare microcapsules, which exhibited an average particle size of 11.2 μm. Through observation with a transmission electron microscope, it was confirmed that resin particles and carbon black particles were present independently as the result of no complete capsulation.

Example 7 Preparation of Microcapsules Containing Catalyst 40 g of polyethylene glycol having a molecular weight of 200, 30 g of glycerol and 30 g of tetrabutylammonium salicylate were blended with 8 g of the block polymer obtained in Synthetic Example 1 and 2 g of the block polymer obtained in Synthetic Example 3 by a stirrer at 8000 rpm. 400 g of Isopar M (hydrocarbon solvent by Exxon Corporation) was gradually dripped in the mixture which was continuously stirred, to obtain a dispersion by a phase inversion method. This mixture was transferred into another reaction vessel, 0.08 g of dibutyltin laurate was added thereto, and a 20% Isopar G solution of toluene diisocyanate of 0.95 equivalent with respect to the hydroxyl groups was dripped in the mixture at the room temperature over 1 hour. After a lapse of 2 hours from finishing of the dripping, the temperature was increased up to 45° C. and further reaction was made for 2 hours. Through measurement with a particle size measuring device SALAD 2000 by Shimadzu Corporation, the average particle size of polyurethane particles as obtained was 0.59 μm. The amount of microcapsules obtained by filtering through a screen of 200 meshes was 95% with respect to the total weight of the polyol and the diisocyanate as employed. States of the microcapsules were observed with a transmission electron microscope, to rec-

TABLE 1

| Example | Monomer A | Monomer B*1 | Core Material | Nonaqueous Medium | Block Polymer*2 /Graft Polymer*3 | Average particle size (μm) |
|---|---|---|---|---|---|---|
| 3 | polyethyleneglycol having molecular weight of 200 85 g | toluene diisocyanate | Carmine 6B 15 g | Isopar G | 5 g/5 g | 0.66 |
| 4 | polyethyleneglycol having molecular weight of 200 85 g | hexamethylene diisocyanate | Pig. Yellow 12 15 g | Isopar G /Toluene (90/10) | 3 g/7 g | 0.72 |
| 5 | m-xylenediamine 90 g | tetramethylxylene diisocyanate | carbon black 10 g | Isopar H /Toluene (90/10) | 4 g/6 g | 0.741 |
| 6 | EDR-148 *4 95 g | tetramethylxylene diisocyanate | Rhodamine G 10 g | Isopar H | 6 g/4 g | 0.92 |

*1 0.95 equivalent with respect to monomer A
*2 prepared in Synthetic Example 1
*3 prepared in Synthetic Example 3
*4 polyethylene glycol of 148 in average molecular weight having amino groups on both ends: product by Mitsui Texaco Corporation ognize no crystals of quaternary salt. The microcapsules were introduced into the water and stirred. As the result of analyzing the aqueous phase through HPLC, salicylate ions were detected. Thus, it has been confirmed that quaternary ammonium salt was encapsulated in the microcapsules and released in the water.

Example 8 Preparation of Resin Particles 100 g of Jeffermine EDR-148 (polyethylene glycol with a mean molecular weight of 148 having amino groups on both ends: product by Mitsui Texaco Corporation) and 10 g of the block polymer obtained in Synthetic Example 1 were blended with each other by a stirrer at 8000 rpm. 400 g of Isopar (hydrocarbon solvent by Exxon Corporation) was gradually dripped in the mixture which was continuously stirred, to obtain a dispersion by a phase inversion method. This dispersion was transferred into another reaction vessel and cooled to 10° C., so that a 20% Isopar G solution of isophorone diisocyanate of 0.8 equivalent with respect to the amino groups was dripped therein over 1 hour. After the dripping was finished, the temperature was returned to the room temperature for measurement of the infrared absorption spectrum, and the reaction was continued until no presence of the isocyanate group was confirmed. Through measurement with SALAD 2000 by Shimadzu Corporation, the average particle size of polyurea resin particles as obtained was 0.44 μm. The amount of resin particles obtained by filtering through a screen of 200 meshes was 98% with respect to the total weight of the diamine and the diisocyanate as employed.

Example 9 Preparation of Resin Particles

An operation similar to that in Example 8 was carried out except that the block polymer was replaced by that prepared in Synthetic Example 2, to obtain resin particles of 0.84 μm in average particle size.

Although the present invention has been described in detail, it is clearly understood that the same is by way of illustration and example only and is not to be taken by way of limitation, the spirit and scope of the present invention being limited only by the terms of the appended claims.

What is claimed is:

1. A method of preparing microcapsules, comprising the steps of:

preparing a block polymer having a block of a hydrophobic repeating unit and a block of a hydrophilic repeating unit; and polymerizing a compound having at least two amino groups and/or hydroxyl groups with a compound having at least two functional groups which are reactive with said amino groups and/or hydroxyl groups in a nonaqueous medium in the presence of core material by interfacial polymerization employing said block polymer as a protective colloid, to prepare microcapsules in said nonaqueous medium;

wherein said block of said hydrophobic repeating unit in said block polymer is polysiloxane, and said block of said hydrophilic repeating unit in said block polymer is polyalkylene oxide.

2. The method of preparing microcapsules in accordance with claim 1, wherein said block polymer comprises a single said block of said hydrophobic repeating unit and a single said block of said hydrophilic repeating unit, respectively.

3. The method of preparing microcapsules in accordance with claim 1, wherein the number average molecular weight of said block of said hydrophobic repeating unit in said block polymer is 1000 to 50000, the number average molecular weight of said block of said hydrophilic repeating unit in said block polymer being 100 to 200000.

4. The method of preparing microcapsules in accordance with claim 1, wherein said core material is water soluble material.

5. The method of preparing microcapsules in accordance with claim 1, wherein said compound having at least two functional groups which are reactive with said amino groups and/or hydroxyl groups is a compound having at least two isocyanate groups and/or acid halide groups.

6. A method of preparing microcapsules comprising the steps of:

preparing a block polymer having a block of a hydrophobic repeating unit and a block of a hydrophilic repeating unit; and polymerizing a compound having at least two amino groups and/or hydroxyl groups with a compound having at least two functional groups which are reactive with said amino groups and/or hydroxyl groups in a nonaqueous medium in the presence of core material by interfacial polymerization employing said block polymer as a protective colloid, to prepare microcapsules in said nonaqueous medium;

wherein said block of said hydrophobic repeating unit in said block polymer is a polymer block of a hydrophobic acrylic monomer, and said block of said hydrophilic repeating unit in said block polymer is a polymer block of a hydrophilic acrylic monomer.

7. The method of preparing microcapsules in accordance with claim 6, wherein said compound having at least two functional groups which are reactive with said amino groups and/or hydroxyl groups is a compound having at least two isocyanate groups and/or acid halide groups.

8. The method of preparing microcapsules in accordance with claim 6, wherein said block polymer comprises a single block of said hydrophobic repeating unit and a single block of said hydrophilic repeating unit, respectively.

9. The method of preparing microcapsules in accordance with claim 6, wherein the number average molecular weight of said block of said hydrophobic repeating unit in said block polymer is 1,000 to 50,000 and the number average molecular weight of said block of said hydrophilic repeating unit in said block polymer is 100 to 200,000.

10. The method of preparing microcapsules in accordance with claim 6, wherein said core material is water soluble material.

* * * * *